(12) United States Patent
Gross et al.

(10) Patent No.: US 7,693,834 B2
(45) Date of Patent: Apr. 6, 2010

(54) SEARCH ENGINE THAT DYNAMICALLY GENERATES SEARCH LISTINGS

(75) Inventors: William Gross, Pasadena, CA (US); Sean Olson, Santa Monica, CA (US)

(73) Assignee: SNAP Technologies, Inc., Pasadena, CA (US)

( * ) Notice: Subject to any disclaimer, the term of this patent is extended or adjusted under 35 U.S.C. 154(b) by 1131 days.

(21) Appl. No.: 11/006,064

(22) Filed: Dec. 6, 2004

(65) Prior Publication Data

US 2005/0131884 A1 Jun. 16, 2005

Related U.S. Application Data

(60) Provisional application No. 60/527,048, filed on Dec. 4, 2003.

(51) Int. Cl.
G06F 17/30 (2006.01)
(52) U.S. Cl. ................................ 707/4; 707/10; 705/10
(58) Field of Classification Search .................... 707/2, 707/3, 4, 5, 7, 10, 101; 705/26, 27, 1, 16, 705/20, 30, 34, 40, 409, 10; 709/201, 203
See application file for complete search history.

(56) References Cited

U.S. PATENT DOCUMENTS

| | | |
|---|---|---|
| 5,659,732 A | 8/1997 | Kirsch |
| 5,845,278 A | 12/1998 | Kirsch et al. |
| 5,920,854 A | 7/1999 | Kirsch et al. |
| 5,983,216 A | 11/1999 | Kirsch et al. |
| 6,018,733 A | 1/2000 | Kirsch et al. |
| 6,070,158 A | 5/2000 | Kirsch et al. |
| 6,078,866 A | 6/2000 | Buck et al. |
| 6,161,102 A | 12/2000 | Yanagihara et al. |

(Continued)

OTHER PUBLICATIONS

Henrich et al., Supporting Collaborative Software Development by Context-Aware Information Retrieval Facilities, Database and Expert Systems Applications, 2003. Proceedings. 14th International Workshop on Sep. 1-5, 2003, pp. 249-253.*

*Primary Examiner*—Greta L Robinson
(74) *Attorney, Agent, or Firm*—Christie, Parker & Hale, LLP (57) ABSTRACT

A search engine for dynamically generating search results for the user is disclosed. In one embodiment, the user submits a first search query for searching a primary database, such as the content obtained from the World Wide Web, and the search engine obtains primary search listings based upon the search query, which search listings are distinguished from banner advertisements. The system then performs a further search of one or more secondary databases. The secondary search is initiated by the user or automatically by the system, based upon one or more search parameters. The secondary databases may include internal databases maintained by a provider of goods or services, databases that are updated in real time, or databases that include data obtained from a variety of different sources. Examples of secondary databases include inventory databases, product information databases, scheduling databases, market-related databases, location databases or any other database. The search engine compiles the primary search results and secondary search results to produce dynamic search results. The system then presents the dynamic search results to the user, advantageously providing enhanced search listings that include both static and dynamic content relevant to the user's interests and needs.

13 Claims, 6 Drawing Sheets

U.S. PATENT DOCUMENTS

| | | |
|---|---|---|
| 6,269,361 B1 | 7/2001 | Davis et al. |
| 6,321,228 B1 | 11/2001 | Crandall et al. |
| 6,430,558 B1 | 8/2002 | Delano |
| 6,519,618 B1 | 2/2003 | Snyder |
| 6,581,056 B1 * | 6/2003 | Rao .............................. 707/5 |
| 6,691,103 B1 | 2/2004 | Wozny |
| 6,789,076 B1 * | 9/2004 | Dutta ............................ 707/5 |
| 7,103,593 B2 * | 9/2006 | Dean .............................. 707/5 |
| 7,240,045 B1 * | 7/2007 | Bushee .......................... 707/3 |
| 2002/0103797 A1 * | 8/2002 | Goel et al. ..................... 707/5 |
| 2002/0198869 A1 * | 12/2002 | Barnett ......................... 707/3 |
| 2003/0041054 A1 * | 2/2003 | Mao et al. ..................... 707/3 |
| 2003/0216930 A1 * | 11/2003 | Dunham et al. ................ 705/1 |
| 2004/1003463 * | 2/2004 | Carmel et al. .................. 707/5 |
| 2004/0103087 A1 * | 5/2004 | Mukherjee et al. ............. 707/3 |

\* cited by examiner

SEARCH ENGINE THAT DYNAMICALLY GENERATES SEARCH LISTINGS

CROSS-REFERENCE TO RELATED APPLICATION(S)

This application claims priority of U.S. provisional patent application No. 60/527,048, filed Dec. 4, 2003, the contents of which are hereby incorporated by reference.

FIELD OF THE INVENTION

The present invention relates generally to an Internet searching application, and more specifically to an Internet searching application capable of providing search results with increased relevancy.

BACKGROUND OF THE INVENTION

There are many online search engines capable of searching computer networks for information and generating listings of search results based on information located in the search. Often, conventional search results include an excerpt from a document located in the search, thereby providing the user with information regarding that document. The content and organization of the search results can be based on wide variety of factors. For example, search results can be based on the relevancy of information stored in a document found by the search engine, or on a payment made for listing a particular document in the search results. Search results generated based on factors such as these are substantially static: that is, the content of the search results generally does not vary over time, since the content of the underlying documents is static.

SUMMARY OF THE INVENTION

In an exemplary embodiment, the present invention provides a system and method for dynamically generating search results for the user. In one embodiment, the user submits a first search query for searching a primary database, such as the content obtained from the World Wide Web, and the system obtains primary search listings based upon the search query, which search listings are distinguished from banner advertisements. The system then performs a further search of one or more secondary databases. The secondary search is initiated by the user or automatically by the system, based upon one or more search parameters. The secondary databases may include inventory databases, product information databases, scheduling databases, market-related databases, location databases or any other database. In another exemplary embodiment, the system obtains secondary search results based upon the search of the one or more of the secondary databases, and compiles the primary search results and secondary search results to produce dynamic search results. The dynamic search results include at least one listing that combines at least a portion of the primary search results and a portion of a secondary search results. The system then presents the dynamic search results to the user, advantageously providing enhanced search listings that include both static and dynamic content relevant to the user's interests and needs.

DETAILED DESCRIPTION OF THE INVENTION

A preferred embodiment of the present invention operates on the Internet, and more specifically, on the World Wide Web. The World Wide Web is based on, among other protocols, the Hypertext Transfer Protocol (HTTP), which uses a general connection-oriented protocol such as the Transmission Control Protocol/Internet Protocol (TCP/IP). However, the present invention is not limited to HTTP, nor to its use of TCP/IP or any other particular network architecture, software or hardware which may be described herein. The principles of the invention apply to other communications protocols, network architectures, hardware and software which may come to compete with or even supplant the state of the art at the time of the invention.

Throughout the following description, the term "website" is used to refer to a collection of content. Website content is often transmitted to users via one or more servers that implements the basic World Wide Web standards for the coding and transmission of HTML documents. It will be understood to one skilled in the art that the term "website" is not intended to imply a single geographic or physical location but also includes multiple geographically distributed servers that are interconnected via one or more communications systems.

Additionally, unless otherwise indicated, the functions described herein are preferably performed by programs including executable code or instructions running on one or more general-purpose computers. The computers can include one or more central processing units for executing program code, volatile memory, such as random access memory (RAM) for temporarily storing data and data structures during program execution, non-volatile memory, such as a hard disc drive or optical drive, for storing programs and data, including databases, and a network interface for accessing an intranet and/or the Internet. However, the present invention can also be implemented using special purpose computers, state machines, and/or hardwired electronic circuits. The example processes described herein do not necessarily have to be performed in the described sequence, and not all states have to be reached or performed.

Further, while the following description may refer to "clicking on" a link or button, or pressing a key in order to provide a command or make a selection, the commands or selections can also be made using other input techniques, such as using voice input, pen input, mousing or hovering over an input area, and/or the like. In addition, the terms "article", "item" and "product" can be used interchangeably.

Search engines often store a number of pre-generated listings which are provided to users who submit search terms that include keywords associated with the listings. Such listings can be produced in exchange for an inducement or incentive, such as a payment. Pre-generated search listings are generally developed in advance, either by an advertiser or other sponsor of the listing, the search engine itself, or otherwise, and the information contained therein is not modified or adapted before delivery to a particular user. Thus, different users who submit a keyed search term (for example, "coupe") will receive the same paid search listing (for example, an advertisement for a sports car vendor).

Listings generated based on receipt of an incentive, sometimes called "paid listings", that are updated based on other factors that exist at the time of the search, and that are relevant to the subject matter being searched, can provide the user with additional information not included in conventional static paid listings. Such other factors can include data directly related to the search terms, such as price points (for example, "less than $25", "between $25.01 and $50", and "over $50"), product availability (for example, "available now", and "ships in n weeks"), inventory levels (for example, "n products currently in stock"), auction-related parameters corresponding to a product identified from the search terms. The other factors can also include data indirectly related to the search terms, such as user demographics or data relating to financial market indices extant at the time of the search.

By customizing the content of the pre-generated paid listings based on such other factors, the paid listings can be made more relevant to the user's interests and needs. Increased relevancy of paid listings advantageously allows search engine administrators to increase "click-through" rates, provides users with more relevant information, and provides advertisers with "higher quality" website traffic. As used herein, "higher quality" traffic refers, in addition to its ordinary meaning, to website traffic from users who have an increased interest in the website being viewed.

Figure 1:
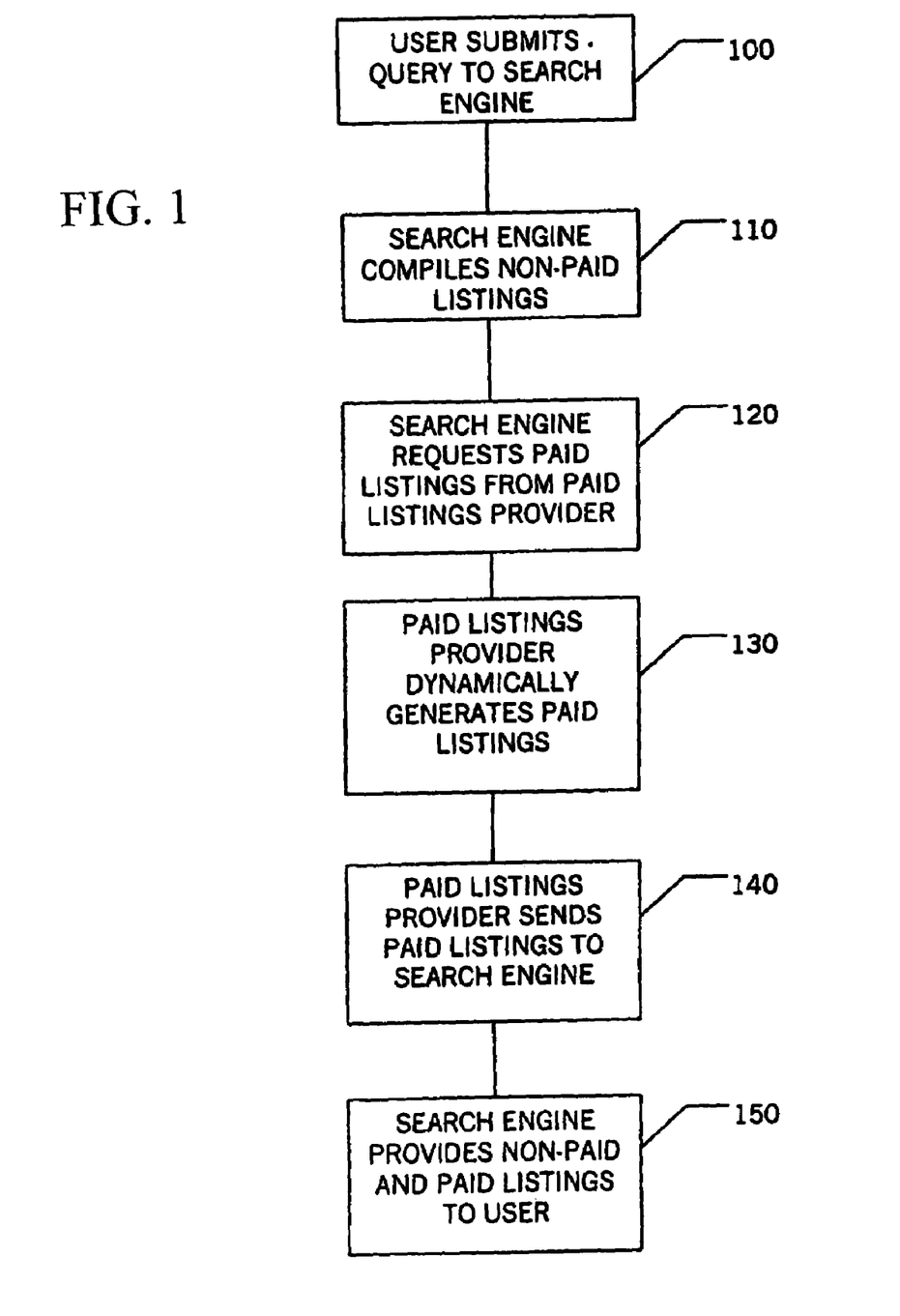
FIG. 1 is a flowchart illustrating the operation of an exemplary Internet search application capable of creating dynamically generated search listings.
Figure 2:
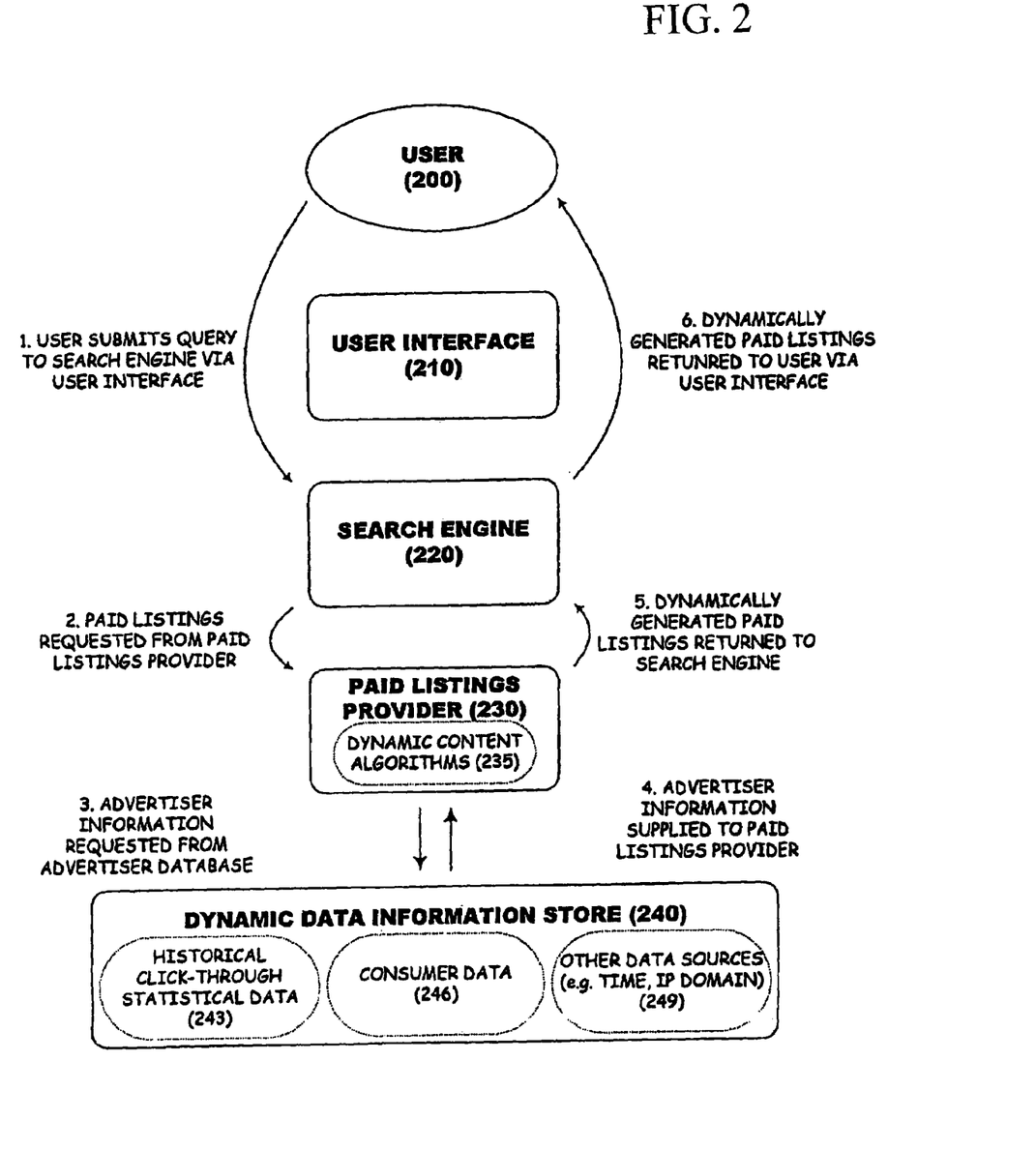
FIG. 2 is a schematic diagram illustrating the components of the exemplary Internet search application of FIG. 1.
Figure 5:
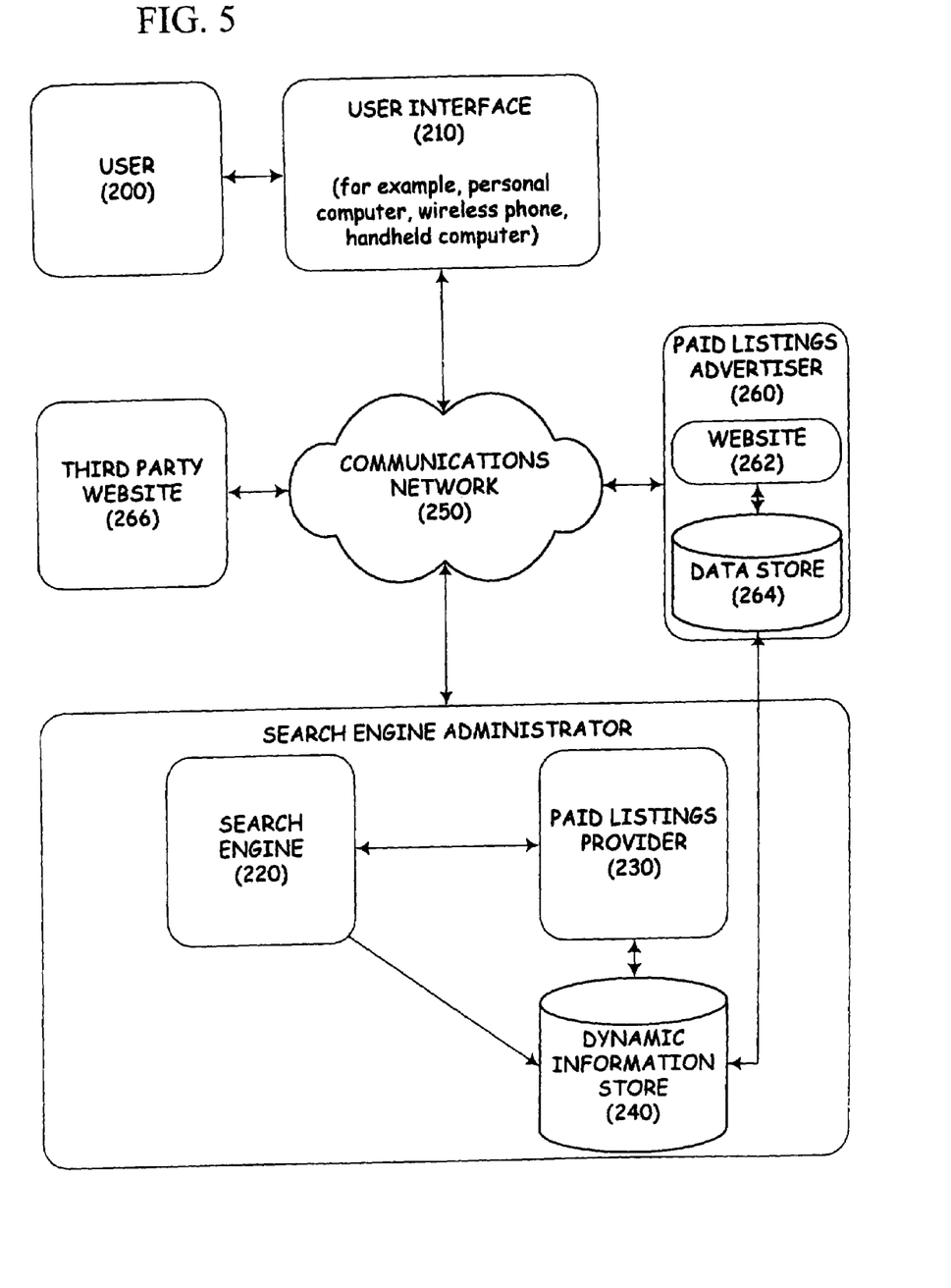
FIG. 5 is a hardware diagram illustrating the components of an exemplary Internet search application capable of creating dynamically generated search listings.
Figure 7:
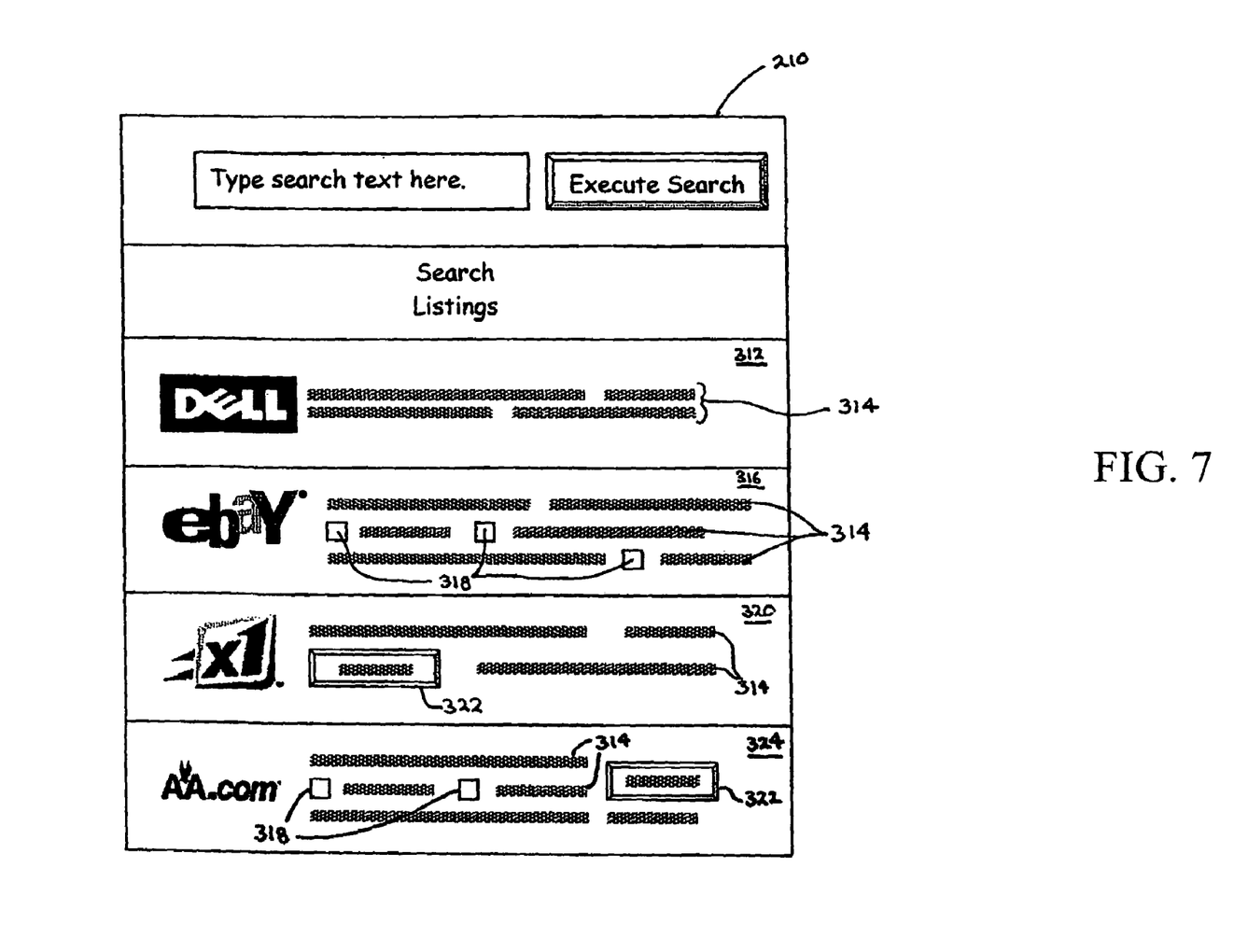
FIG. 7 is a schematic illustration of an exemplary graphical user interface displaying a plurality of search results, including both static and dynamically generated search results.

Referring now to FIGS. 1 and 2, the operation of an exemplary embodiment of an Internet search application is described. FIG. 5 illustrates exemplary hardware components that can be used in the implementation of the Internet search application illustrated in FIGS. 1 and 2. By way of example, this application can be implemented using instructions, modules, and/or the like that are executed on or by one or more computer systems. As illustrated in FIGS. 1 and 2, a user 200 submits a query to a search engine 220 via a user interface 210 in operational block 100. As illustrated in FIG. 5, the query can be communicated to the search engine via the Internet 250, although other communications modes, such as an intranet, can be used in other embodiments. In an exemplary embodiment, as illustrated in FIG. 7, the user interface 210 includes a graphical user interface.

For example, the user interface can be provided via a webpage generated using HTML, JavaScript, XML, and the like, received from a website associated with the search engine. In other embodiments, other user interfaces capable of receiving information from the user 200 can be used, such as text-based user interfaces or audio- and voice-based user interfaces. In an exemplary embodiment, the query is a text-based string of words or phrases that describe the subject matter to be searched.

After the user 200 submits a search query to the search engine 220, the search engine 220 can optionally compile non-paid listings in an operational block 110. In one embodiment, the non-paid listings comprise results from a search of a computer network, such as the Internet. In another embodiment, the non-paid listings are compiled by the same software that provides the user interface 210. In a modified embodiment, the search is performed by a distinct searching component, such as an independent Internet search engine. In still other embodiments, a plurality of searches can be performed by a variety of different Internet search engines. Although operational block 110 is positioned immediately after operational block 100 in the embodiment illustrated in FIG. 1, in other embodiments, compiling non-paid listings can occur after other acts that follow the user's submission of a query to the search engine 220 in operational block 100.

Still referring to FIGS. 1, 2 and 5, after the search engine 220 receives the user's query, the search engine 220 requests paid listings from a paid listings provider 230 in an operational block 120. The paid listings provider 230 is configured to generate paid listings based on the query provided by the user 200. In one embodiment, the paid listings are optionally compiled by the same software that provides the non-paid listings. In an exemplary embodiment, the paid listings are generated by matching search terms from the user's query with keywords associated with a plurality of paid listings stored in a database.

In certain embodiments, at least a portion of the paid listings are "dynamically generated paid listings". Dynamically generated paid listings include information that is dependent on one or more other factors, including dynamically changing information associated with a webpage or a database, that exist when the search is performed, thereby providing "multi-dimensional dynamically generated paid listings". Dynamically generated listings are distinguishable from conventional "static listings", which generally provide information that is not updated or changing.

One example of such an other factor is quantity available. Thus, a dynamically generated paid listing for a particular sports coupe can include information with respect to the quantity of sports coupes available from a particular vendor. Such a listing would be considered "dynamically generated" because at least a portion of its content depends on an other factor existing at the time of the search (in this example, quantity available), which can typically change with a relatively high frequency, such as once a minute, once an hour, or once a day. Consequently, dynamically generated paid listings generally have relatively enhanced informational content relative to conventional paid or non-paid listings that provide relatively static information content.

In one embodiment, a system for generating dynamic search results includes: a search engine for initiating a search query, and a dynamic data store developed from a plurality of sources according to one or more predetermined rules. At least one source includes information from content obtained from the World Wide Web, another source of information is a private database maintained by a paid listings provider, and a further source of information is content pushed into the database by a paid listings provider independent of the search query. The search engine conducts a search of the dynamic data store and returns search results based upon the search of the dynamic data store.

Figure 3:
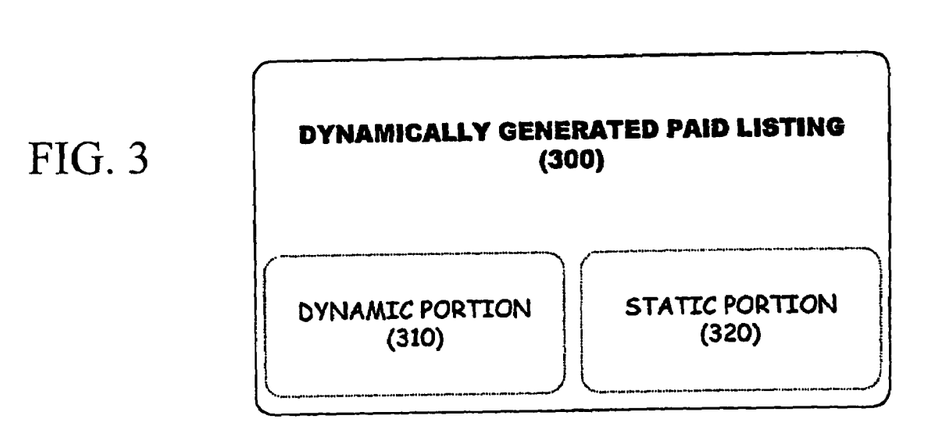
FIG. 3 is a schematic illustration of a generic dynamically generated paid listing.
Figure 4:
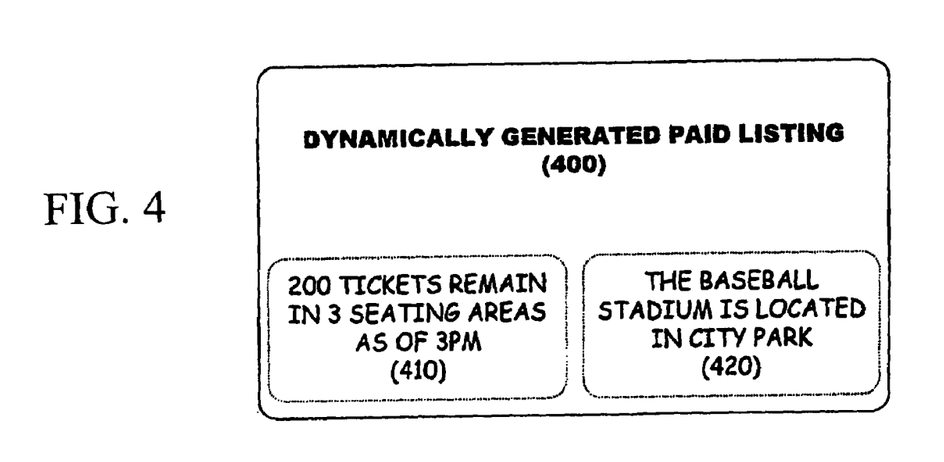
FIG. 4 is a schematic illustration of an exemplary dynamically generated paid listing relating to a listing for a baseball team.

Referring now to FIGS. 3 and 4, two exemplary dynamically generated paid listings are illustrated. FIG. 3 illustrates a generic dynamically generated paid listing 300, and FIG. 4 illustrates an exemplary dynamically generated paid listing relating to a listing for a baseball team. Each of the dynamically generated paid listings 300, 400 comprises a dynamic portion 310, 410 that contains information specifically generated for a particular search, and comprises a static portion 320, 420 that contains information that remains static regardless of other factors, such as the time the search was conducted. The static portion 320, 420 and/or the dynamic portion 310, 410 can optionally contain both textual and graphical content, such as icons and pictures, as well as interactive content. Examples of interactive content that can be included in the search listing include an "add to shopping cart" button, an "install now" button, or a "buy now" button; fields can also be provided that allow the user to enter a query, such as "check quantity" or "submit new bid". In embodiments wherein the user enters information via the search result, the user interface can be configured to submit that information directly to the advertiser sponsoring the interactive search result.

By way of example, if the search that produced the search listing illustrated in FIG. 4 was conducted at 3 pm, then the dynamic portion 410 contains information specific to the inventory of tickets available at 3 pm. In this example, the dynamic information relates to a plurality of parameters, specifically the number of remaining tickets, the number of seating areas available, and the time of the availability. These three dynamic information parameters can be obtained from one or more information sources. For example, the number of remaining tickets can be obtained from a first database, the number of seating areas available can be obtained from a second database. In such embodiments, the source of the information can optionally be embedded in metatags within the dynamic listing, effectively providing the paid listings provider 230 with instructions on how to retrieve the information used to create the dynamically generated paid listings.

As another example, FIG. 7 illustrates an exemplary graphical user interface 210 displaying a plurality of search listings, including both static and dynamically generated search listings. For example, static search listing 312 comprises, for example, static text 314 from the website corresponding to that search listing. In contrast, a first dynamically generated search listing 316, which in the illustrated exemplary embodiment corresponds to a online auction website, contains both static text 314 as well as dynamically generated content 318. In the case of an auction website, the dynamically generated content 318 can relate to parameters such as the auction duration, the minimum bid, the current bid, the number of bids, and the quantity of items available. The dynamically generated content 318 can be textual, numerical, and/or graphical, and can be updated, for example, each time a search is executed, or, in other embodiments, even more frequently.

Still referring to FIG. 7, a second dynamically generated search listing 320 contains both static text 314 and an operational button 322. In this example, the operational button 322 can be configured to perform one or more of a variety of different actions, such as initiating a transaction, completing a transaction, printing a document, downloading a file, or registering a vote. This configuration advantageously allows the search listing 320 to be used as a portal to the website identified in the search listing 320. Other combinations of static text, dynamic test, and operational buttons can be used in other embodiments. For example, in FIG. 7, a third dynamically generated search listing 324 contains both an operational button 322, static text 314 and dynamically generated content 318.

In some cases, information is retrieved from a dynamic data information store 240 before creating the dynamically generated paid listings. In an exemplary embodiment, information is extracted from the dynamic data information store 240 (see FIGS. 2 and 5) and is used in generating dynamically generated paid listings in operational block 130 (see FIG. 1). Information stored in the dynamic data information store 240 typically includes data such as pricing information, inventory information, auction-related content and product descriptions. Additional examples of information stored in the dynamic data information store 240 are provided in TABLE 1, below. The dynamic data information store 240 can be a centralized information store that receives information from a plurality of information sources, or can be a distributed network, such as a network of advertiser websites which can be polled for dynamic and/or static information.

For example, in the embodiment illustrated in FIG. 2, the dynamic data information store 240 comprises a plurality of information sources, such as a statistical compilation 243 of click-through data for various paid search listings, a database containing consumer information 246, and other information sources 249 capable of providing information such as the date/time a search is performed, the Internet protocol address of a user, or information relating to outside indices, such as financial market indices or consumer price indices. Thus, the dynamic data information store 240 can compile information from sources other than advertisers. Dynamically generated paid listings can be compiled in response to a user-submitted query, or can be generated at a preset frequency and stored for future use.

Additionally, the dynamic data information store 240 can optionally compile information from other sources, such as the search engine 220 and/or the paid listings provider 230. The dynamic data information store can also compile information directly from advertisers or from a website 262 through which the advertiser is offering a good or service, such as an auction website, a retail website (such an electronic mall), or other similar websites. For example, an advertiser or a related website or entity can provide the dynamic data information store 240 with a link to the advertiser's or other entity's database 264, where information with respect to inventory, pricing and historical sales rates can be obtained. In a modified embodiment, the dynamic data information store 240 can engage in a "screen scraping" process whereby information is extracted from a webpage of the advertiser 260 or a third party 266 in an automated process. For example, in an embodiment wherein a dynamically generated paid listing includes information about a product's price and quantity available, the dynamic data information store 240 can be programmed to extract that information from one or more websites known to contain the information. Examples of such a website include a website associated with an auction website, or a website associated with an online retailer. Generally, dynamic data used in the creation of a dynamically generated paid listing can be associated with an information source, such as a webpage, a database, and so forth.

Figure 6:
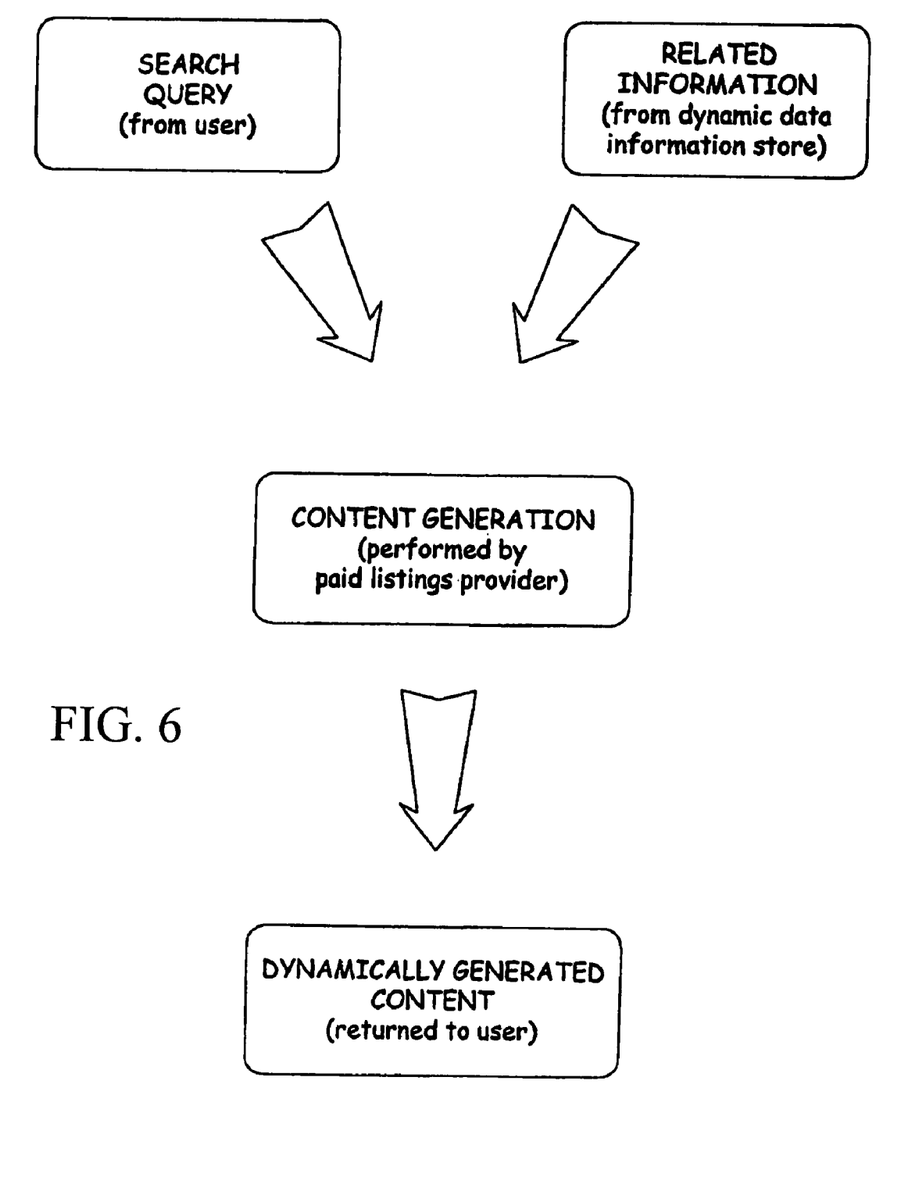
FIG. 6 is a schematic diagram illustrating the operation of an exemplary Internet search application capable of creating dynamically generated search listings.

The creation of dynamically generated search listings as described above is illustrated schematically in FIGS. 2 and 6. Both the search query (provided by the user 200) and related information (compiled from other information sources via the dynamic data information store 240) are provided to the paid listings provider 230. Using dynamic content algorithms 235, the paid listings provider 230 performs content generation using the search query and related information, and thereby produces dynamically generated content. The dynamically generated content is then returned to the user 200 in the from of dynamically generated paid listing.

The dynamically generated paid listings can be generated according to dynamic content algorithms that generate listings based on a variety of source data. In such embodiments, the paid listings provider 230 comprises one or more dynamic content algorithms 235, as illustrated in FIG. 2. For example, in one embodiment, dynamically generated paid listings are generated based on an advertiser's optimal price points, which can be calculated based on real-time data such as inventory levels, sales volumes, profit margins, consumer demand, competitors' prices and auction-related parameters.

In another embodiment, dynamically generated paid listings are generated based on historical data on the effectiveness of a paid listing, which can be calculated based on click-through rates and click-through to purchase rates. For example, an advertiser can monitor click-through rates from the search engine 220, and can adjust pricing information contained in the dynamically generated paid listing to increase the click-through rate toward a target click-through rate. In such embodiments, the dynamically updated price can be calculated according to the following expression:

$$Price_{updated} = Price_{initial} \times k \times \frac{Click\text{-}Through_{actual}}{Click\text{-}Through_{target}}$$

where $Price_{updated}$ is the dynamically updated price, $Price_{initial}$ is a first price previously listed in a paid listing, $Click\text{-}Through_{actual}$ is the click-through rate achieved when the first price was listed in the paid listing, $Click\text{-}Through_{target}$ is the target click-through rate, and k is a calibration constant.

Optionally, the dynamically generated paid listings are generated based, in whole or in part, on user data, such as demographic information, price elasticity, past search behavior and past purchase behavior. The dynamically generated paid listings can also be generated based on other data, such as indices of competitive prices, date/time of search, user's Internet protocol address ("IP"), and stock market indices. For example, an advertiser of a downloadable software product may change the marketing message, price and language if a user's IP address indicates they are accessing the site from a specific international location.

As described above, such information can be compiled from non-advertiser sources such as the search engine 220 and/or the paid listings provider 230. Dynamically generated paid listings generated based on such data can advantageously be more closely related to the user's interests. Consequently, dynamically generated paid listings can provide advertisers with "higher quality" traffic, especially when used in conjunction with the sale of products having prices that vary as a function of time based on yield, products sold at auctions, and products that typically sell based only on the product price. Examples of products for which dynamically generated listings are well adapted are listed in TABLE 1.

TABLE 1

| | exemplary products and/or services for which dynamically generated listings are well-adapted | | |
|---|---|---|---|
| | air travel | automobiles | auctions |
| exemplary characteristics upon which dynamic data can be based | search time/date travel time/date itinerary class of travel carrier price seat availability equipment type entertainment availability food availability | availability price color dealer location rebate information loan interest rates down payment required | auction duration minimum bid current bid number of bids terms of sale quantity available |

For example, in one embodiment an advertiser is presented with lists of characteristics upon which dynamic data can be based depending on the product the advertiser is selling, similar to the exemplary lists set forth in TABLE 1. In such embodiments, each characteristic is optionally associated with an information source where that information can be obtained. For example, a listing for air travel services can be configured to obtain dynamic data regarding seat availability from an airline's website. Or, a listing for an automobile retailer can be configured to obtain dynamic data from an information source administered by an automobile manufacturer having rebate availability information. Configurations such as these enable the advertiser to select characteristics to be included in the dynamically generated paid listing by making such information available to the paid listings provider.

Dynamically generated paid listings can also be used in association with products other than those listed above in TABLE 1. Additionally, dynamically generated paid listings can also provide advertisers with higher quality traffic when used in conjunction with the sale of other goods or services not listed here.

As described above, the paid listings provider 230 dynamically generates paid listings based on information retrieved from the dynamic data information store 240 in operational block 130. In one embodiment, this is accomplished according to a set of pre-programmed rules that determine, for example, what portions of the listing will be dynamically generated, what algorithms will be used to generate the dynamic portion of the listing, and what type of source data will be provided to the algorithm. In a modified embodiment, the rules can be configured to adjust the dynamic content of the dynamically generated paid listings based on real-time performance data, such as click-through rates, click-through to purchase rates, or sales rates. For example, in one embodiment a rule is configured to reduce the price displayed in a dynamically generated paid listing to reach a target click-through rate or sales rate specified by an advertiser.

Referring still to FIG. 1, after the paid listings provider 230 generates the dynamically generated paid listings, the paid listings are provided to the search engine 220 in operational block 140. As described above, the paid listings can comprise non-dynamically generated paid listings, dynamically generated paid listings, or a variety of both types of paid listings.

After the paid listings are provided to the search engine, the paid listings (and the non-paid listings, if any) are provided to the user 200 via the user interface 210 in operational block 150. As illustrated in FIG. 5, the listings can be communicated to the user interface via the Internet 250, although other communications modes can be used in other embodiments. Additionally, the user interface 210 can be configured to sort the listings for the user according to a variety of different algorithms. For example, the listings returned to the user can be grouped or "clustered" based on the keywords for which an advertiser has paid. Specifically, if an advertiser pays for several keywords, and a user submits a search with one of those keywords, the user interface 210 can be configured to provide the user with search results relating to other, related keywords for which the advertiser has paid. The user interface 210 can be configured to cluster the search results based on the underlying, related, keywords. Other clustering algorithms can also be used, such as algorithms configured to cluster search results based on related advertisers or industries.

In these and other embodiments, the user interface 210 optionally provides functionality for the user 200 to browse the search results and click-through to the various information sources, such as Internet WebPages, listed in the search results. The user interface 210 can be configured to allow the user to select how the search results are displayed, such as according to keyword relevancy, advertiser, or another clustering criterion.

The various embodiments of the Internet search application described herein offer several advantages over conventional systems. For example, the use of dynamically generated paid listings allows a user 200 to view relevant dynamic information on the products for which information is sought. Such information allows the user to evaluate comparable products quickly and more efficiently by eliminating the process of browsing through a plurality of advertisers' websites. Advertisers using dynamically generated paid listings can provide dynamic and targeted information to potential customers, thereby routing "higher quality" traffic to the advertisers' websites. Likewise, dynamically generated paid listings provide search engine administrators with a technique for more efficiently linking buyers and sellers.

While the foregoing detailed description has described several embodiments of the present invention, it should be understood that the above description is illustrative only and is not limiting of the disclosed invention. It will be appreciated that the specific configurations and operations disclosed can differ from those described above, and that the methods described herein can be used in contexts other than Internet searching, including for example in the context of file system searching.

What is claimed is:

1. A method for dynamically generating search results using a computer, the method comprising:
   submitting on the computer a primary search query for searching a primary database, wherein the primary database includes data associated with one or more of a plurality of providers;
   obtaining primary search listings based upon the search of the primary database;
   searching, based upon one or more secondary search parameters, one or more secondary databases related at least in part to the subject matter of the search listings obtained in response to the primary search; and
   presenting on the computer dynamic search results that include data gathered in response to the search of the secondary database,
   wherein the dynamic search results include dynamically changing information associated with a webpage or a database that exist when the search is performed.

2. A method for dynamically generating search results using a computer, the method comprising:
   submitting on the computer a primary search query for searching a primary database, wherein the primary database includes data associated with one or more of a plurality of providers;
   obtaining primary search listings based upon the search of the primary database;
   searching, based upon one or more secondary search parameters, one or more secondary databases related at least in part to the subject matter of the search listings obtained in response to the primary search; and
   presenting on the computer dynamic search results that include data gathered in response to the search of the secondary database,
   wherein the dynamic search results include both textual and graphical content, including icons associated with at least the paid listings provider.

3. A method for dynamically generating search results using a computer, the method comprising:
   submitting on the computer a primary search query for searching a primary database, wherein the primary database includes data associated with one or more of a plurality of providers;
   obtaining primary search listings based upon the search of the primary database;
   searching, based upon one or more secondary search parameters, one or more secondary databases related at least in part to the subject matter of the search listings obtained in response to the primary search;
   presenting on the computer dynamic search results that include data gathered in response to the search of the secondary database; and
   using the dynamic search listing as a portal to a website identified in the dynamic search results.

4. A method for dynamically generating search results using a computer, the method comprising:
   submitting on the computer a primary search query for searching a primary database, wherein the primary database includes data associated with one or more of a plurality of providers;
   obtaining primary search listings based upon the search of the primary database;
   searching, based upon one or more secondary search parameters, one or more secondary databases related at least in part to the subject matter of the search listings obtained in response to the primary search;
   presenting on the computer dynamic search results that include data gathered in response to the search of the secondary database; and
   locating the secondary database from a metatag of a website identified in the search of the primary database.

5. A method for dynamically generating search results using a computer, the method comprising:
   submitting on the computer a primary search query for searching a primary database, wherein the primary database includes data associated with one or more of a plurality of providers;
   obtaining primary search listings based upon the search of the primary database;
   searching, based upon one or more secondary search parameters, one or more secondary databases related at least in part to the subject matter of the search listings obtained in response to the primary search; and
   presenting on the computer dynamic search results that include data gathered in response to the search of the secondary database,
   wherein the search parameters are based upon the rules configured to adjust the content of the dynamic search results based on real-time performance data.

6. The method of claim 5, wherein the real-time performance data includes one or more of click-through rates, click-through to purchase rates, or sales rates.

7. A method for dynamically generating search results using a computer, the method comprising:
   submitting on the computer a primary search query for searching a primary database, wherein the primary database includes data associated with one or more of a plurality of providers;
   obtaining primary search listings based upon the search of the primary database;
   searching, based upon one or more secondary search parameters that are at least partly obtained from a result of the search of the primary database, one or more secondary databases related at least in part to the subject matter of the search listings obtained in response to the primary search;
   presenting on the computer dynamic search results that include at least a portion of the primary search listings and data gathered in response to the search of the secondary database, wherein the dynamic search results include a price relating to a product or service provided as part of a paid listing that is associated with the subject matter of the primary search query, wherein price of the product and/or service is included within the dynamic search results; and updating the price included within the dynamic search results based upon the following function:

$$Price_{updated} = Price_{initial} \times k \times \frac{Click\text{-}Through_{actual}}{Click\text{-}Through_{target}}$$

wherein $Price_{updated}$ is a dynamically updated price, $Price_{initial}$ is a first price previously listed in a paid listing, $Click\text{-}Through_{actual}$ is a click-through rate achieved when the first price was listed in the paid listing, $Click\text{-}Through_{target}$ is a target click-through rate, and k is a calibration constant.

8. A method for dynamically generating search results using a computer, the method comprising:
submitting on the computer a primary search query for searching a primary database, wherein the primary database includes data associated with one or more of a plurality of providers;
obtaining primary search listings based upon the search of the primary database;
searching, based upon one or more secondary search parameters, one or more secondary databases related at least in part to the subject matter of the search listings obtained in response to the primary search;
presenting on the computer dynamic search results that include data gathered in response to the search of the secondary database; and
modifying the dynamic search results based on price points calculated using real-time data such as one or more of inventory levels, sales volumes, profit margins, consumer demand, competitors' prices or auction-related parameters.

9. A method for dynamically generating search results using a computer, the method comprising:
submitting on the computer a primary search query for searching a primary database, wherein the primary database includes data associated with one or more of a plurality of providers;
obtaining primary search listings based upon the search of the primary database;
searching, based upon one or more secondary search parameters, one or more secondary databases related at least in part to the subject matter of the search listings obtained in response to the primary search; and presenting on the computer dynamic search results that include data gathered in response to the search of the secondary database,
wherein the step of presenting the dynamic search results to the user comprises grouping the listings returned to the user based on keywords identified by the paid-listings provider.

10. A method for dynamically generating search listings using a computer, the method comprising:
submitting on the computer a first search query for searching a primary database, wherein the primary database includes data associated with one or more of a plurality of providers, and wherein the providers include non-paid listings providers and paid listings providers;
obtaining primary search results based upon the search of the primary database, wherein the primary search results include non-paid listings associated with one or more of the non-paid listings providers and paid listings associated with one or more of the paid listings providers;
searching, based upon one or more search parameters, one or more secondary databases associated with at least one of the paid listings providers whose paid listing appears in the primary search results, wherein at least one of the secondary databases is updated in real- time;
obtaining secondary search results based upon the search of the one or more of the secondary databases;
compiling the primary search results and secondary search results to produce dynamic search results that include at least one listing that combines at least a portion of the primary search results and at least a portion of the secondary search results; and
presenting on the computer the dynamic search results to the user.

11. The method of claim 10, wherein the step of searching the secondary database comprises searching a dynamic data store that includes data obtained from a plurality of databases according to predetermined rules, and further includes data delivered to the dynamic data store by one or more of the paid listings providers.

12. The method of claim 11, further comprising the step of clustering the dynamic search results prior to presenting the dynamic search results to the user.

13. The method of claim 10 further comprising the step of modifying the dynamic search results based on price points calculated using real-time data, including one or more of inventory levels, sales volumes, profit margins, consumer demand, competitors' prices or auction-related parameters.

* * * * *